United States Patent

Hashimoto

(10) Patent No.: US 9,277,094 B2
(45) Date of Patent: Mar. 1, 2016

(54) IMAGE PROCESSING APPARATUS AND RECORDING MEDIUM

(71) Applicant: Hideyuki Hashimoto, Toyokawa (JP)

(72) Inventor: Hideyuki Hashimoto, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/759,733

(22) Filed: Feb. 5, 2013

(65) Prior Publication Data

US 2013/0215476 A1    Aug. 22, 2013

(30) Foreign Application Priority Data

Feb. 17, 2012   (JP) .................................. 2012-032672

(51) Int. Cl.
| | |
|---|---|
| H04N 1/40 | (2006.01) |
| H04N 1/41 | (2006.01) |
| H04N 1/333 | (2006.01) |
| G06F 17/22 | (2006.01) |
| G06F 17/24 | (2006.01) |
| G06F 3/12 | (2006.01) |

(52) U.S. Cl.
CPC .............. *H04N 1/40* (2013.01); *G06F 17/2235* (2013.01); *G06F 17/2264* (2013.01); *G06F 17/245* (2013.01); *H04N 1/3333* (2013.01); *H04N 1/40062* (2013.01); *H04N 1/41* (2013.01); *H04N 2201/33378* (2013.01)

(58) Field of Classification Search
USPC ......... 358/448, 1.15; 382/100, 173, 176, 180, 382/242
See application file for complete search history.

(56) References Cited

U.S. PATENT DOCUMENTS

| | | | |
|---|---|---|---|
| 7,860,266 B2 * | 12/2010 | Sekiguchi et al. ............ | 382/100 |
| 8,339,619 B2 * | 12/2012 | Misawa ....................... | 358/1.13 |
| 8,514,462 B2 * | 8/2013 | Sohma et al. ................ | 358/448 |
| 2004/0247206 A1 * | 12/2004 | Kaneda et al. ............... | 382/305 |
| 2012/0053992 A1 * | 3/2012 | Erol et al. .................... | 705/7.35 |

FOREIGN PATENT DOCUMENTS

| | | |
|---|---|---|
| JP | 2004-252843 A | 9/2004 |
| JP | 2005-157905 A | 6/2005 |
| JP | 2007-025815 A | 2/2007 |

OTHER PUBLICATIONS

Japanese Office Action (Notice of Grounds of Rejection) dated Feb. 18, 2014, issued in corresponding Japanese Patent Application No. 2012-032672 and an English translation thereof. (4 pgs).

* cited by examiner

*Primary Examiner* — Quang N Vo
(74) *Attorney, Agent, or Firm* — Buchanan Ingersoll & Rooney PC

(57) ABSTRACT

An image processing apparatus includes an acquisition unit and a processing unit. The acquisition unit is configured to acquire an image. The processing unit is configured to select a format of a file corresponding to the image acquired by the acquisition unit, by analyzing a feature of the image. The processing unit is further configured to create a file for each feature of the image in the selected format.

23 Claims, 21 Drawing Sheets

ABC
ABC
SUMMARY OF PROPOSAL
  AN IMAGE READING APPARATUS FOR READING A DOCUMENT INCLUDING A CHARACTER AND A GRAPHIC, AND CONVERTING THE DOCUMENT TO A PRESCRIBED FORMAT, CHARACTERIZED IN THAT A FORMAT INTO WHICH THE DOCUMENT IS TO BE CONVERTED IS AUTOMATICALLY SELECTED BY A FEATURE OF THE READ IMAGE, OR FORMATS ARE DISPLAYED IN DESCENDING ORDER OF POSSIBILITY OF BEING SELECTED TO FACILITATE THE SELECTION.

902

ABC
Table-1 REGARDING ∗∗∗   ABC

| 111 | 2211 | 3311 |
| 112 | 2222 | 3322 |
| 113 | 2233 | 3333 |
| 114 | 2244 | 3344 |
| 115 | 2255 | 3355 |

CONSIDERATION
  IT IS CONSIDERED FROM Table 1 THAT 2211 IS GENERALLY ∗∗ AS COMPARED TO 3311, HOWEVER, THIS DOES NOT APPLY TO 114.

903

ABC
ABC

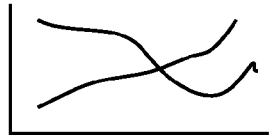

Fig1 TRANSITION OF ∗∗∗

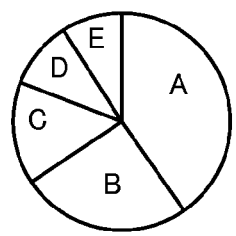

Fig2 RATIO OF ∗∗

904

ABC
ABC

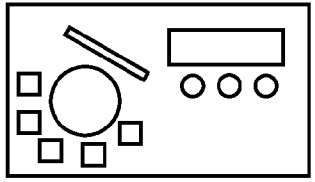

Fig3 LAYOUT

CONCLUSION
  FROM Figs. 1 to 3, PHENOMENON A BECOMES -- IN CONCLUSION.
  IN THE FUTURE, ∗∗ IS CARRIED OUT PREFERENTIALLY, AND IT WILL BE DETERMINED BY THE END OF THIS MONTH WHETHER OR NOT □□□ SHOULD BE CARRIED OUT.

FIG.5
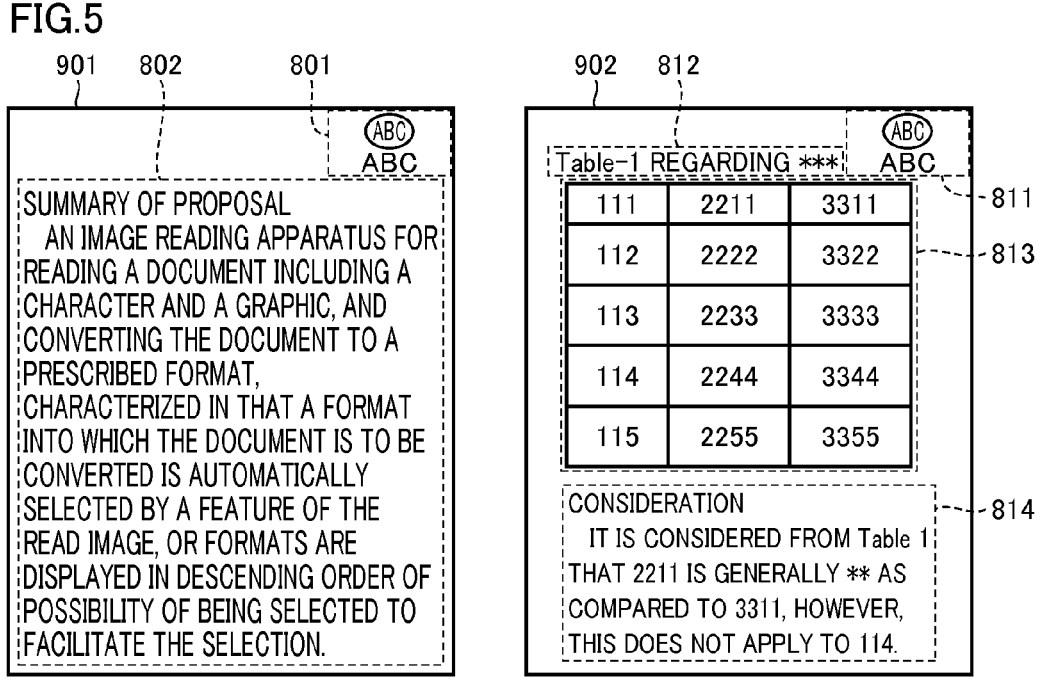
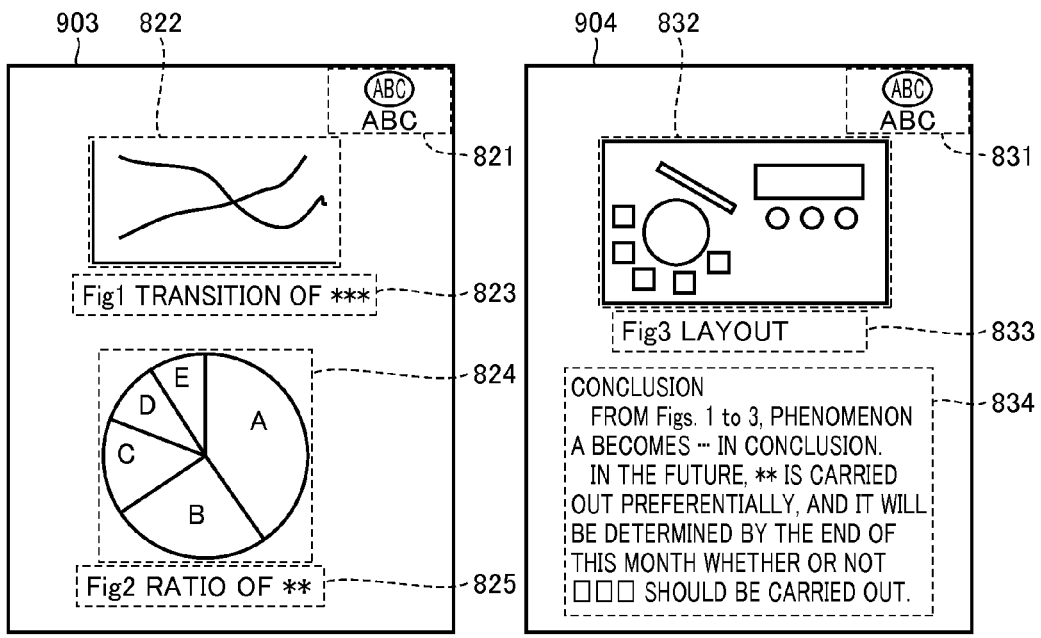

RESULT OF ANALYSIS OF IMAGE

ALIGNED STARTING POSITIONS
OF LINES: 0
(IN CONSIDERATION OF SPACING
OF ONE LEADING CHARACTER: 0)
SAME LINE SPACING: EQUIVALENT
TO 0 LINE
CHARACTER: 2 LINES
TABLE: 0
GRAPHIC/GRAPH: 2
GRAPHIC IN SAME POSITION: NO

| ITEM | VALUE |
|------|-------|
| A | 45 |
| B | 25 |
| C | 10 |
| D | 5 |
| E | 5 |

FIG.15

| FORMAT CAN BE SELECTED AUTOMATICALLY OR MANUALLY ||| 
|---|---|---|
| DOCUMENT CREATION | TABLE CREATION | GRAPHIC CREATION |
| AUTOMATIC SELECTION (SELECT *) |||
| * DOCUMENT CREATION 1 | TABLE CREATION 1 | * GRAPHIC CREATION 1 |
| DOCUMENT CREATION 2 | TABLE CREATION 2 | GRAPHIC CREATION 2 |
| DOCUMENT CREATION 3 | * TABLE CREATION 3 | GRAPHIC CREATION 3 |
| · | · | GRAPHIC CREATION 4 |
| · | · | · |
| · | · | · |

FIG.17

| ITEM / FORMAT | THERE IS SAME GRAPHIC/CHARACTER ON PAGES | THERE IS CHARACTER ONLY WITHIN RULED LINE | ONLY GRAPHIC | CHARACTERS HAVE ALIGNED STARTING POSITIONS |
|---|---|---|---|---|
| PRESENTATION | YES | YES/NO | YES/NO | YES/NO |
| TABLE | NO | YES | NO | YES/NO |
| GRAPHIC | NO | NO | YES | NO |
| DOCUMENT | NO | NO | NO | YES |

STEP 1: FOUR OPTIONS CAN ONLY BE NARROWED DOWN TO PRESENTATION
STEP 2: REMAINING THREE OPTIONS CAN ONLY BE NARROWED DOWN TO TABLE
STEP 3: REMAINING TWO OPTIONS CAN ONLY BE NARROWED DOWN TO GRAPHIC
STEP 4: ONLY AVAILABLE FORMAT IS DOCUMENT

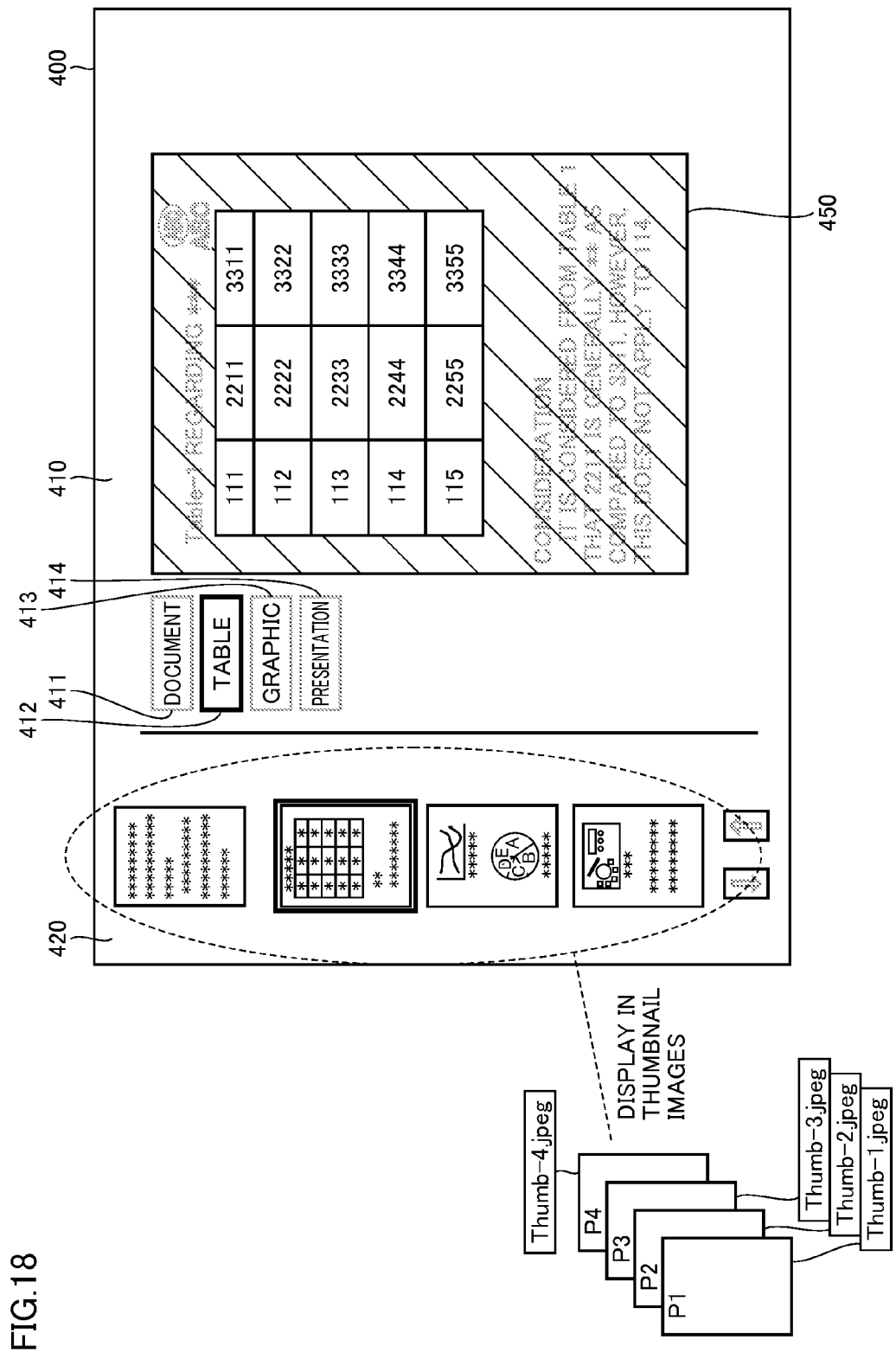

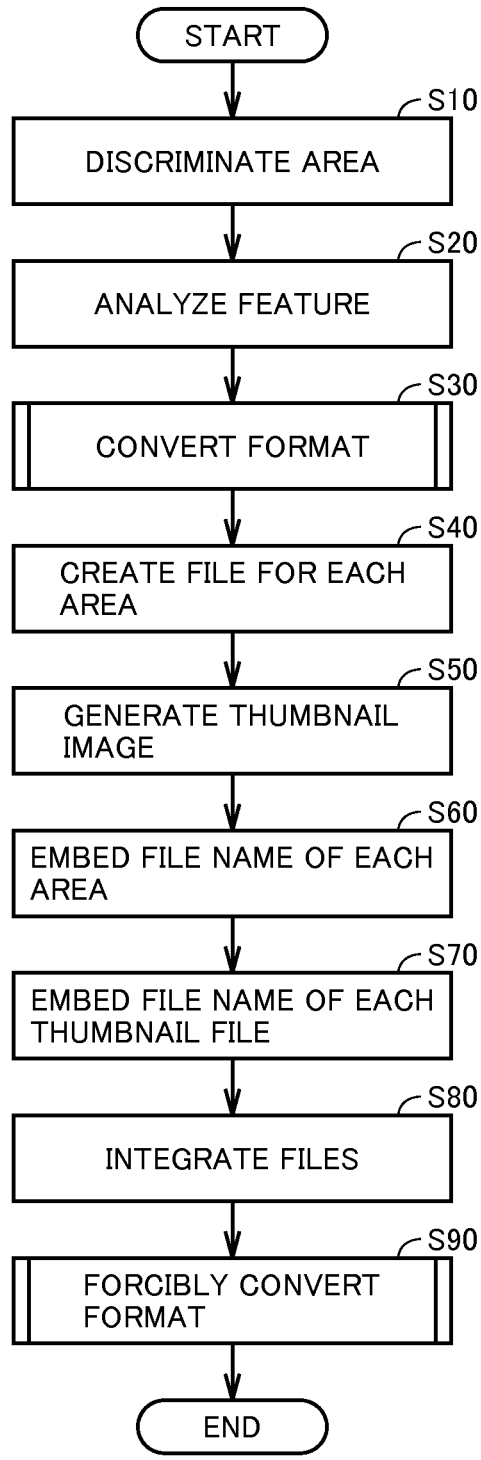

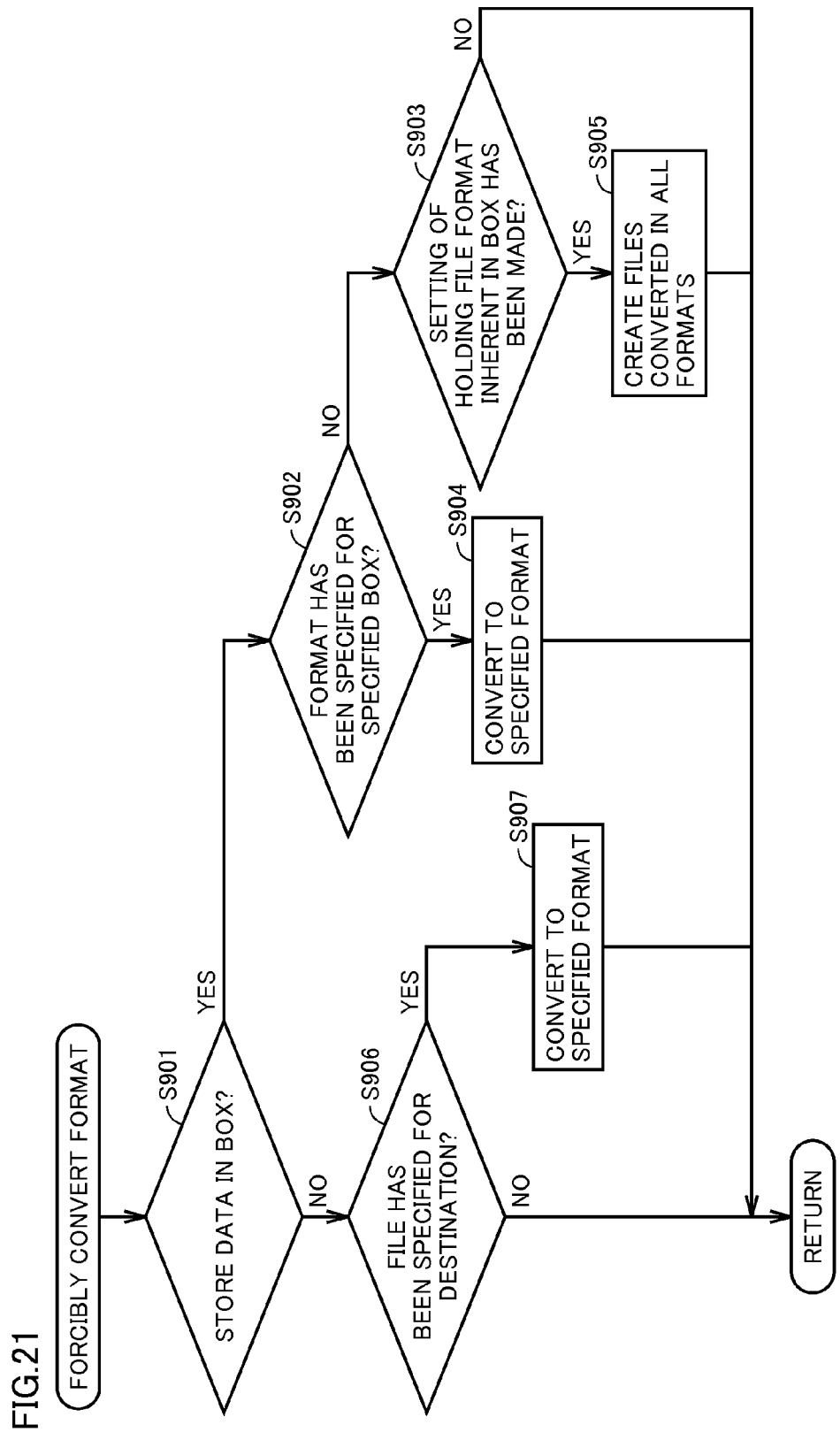

IMAGE PROCESSING APPARATUS AND RECORDING MEDIUM

This application is based on Japanese Patent Application No. 2012-032672 filed with the Japan Patent Office on Feb. 17, 2012, the entire content of which is hereby incorporated by reference.

BACKGROUND OF THE INVENTION

1. Field of the Invention

The present invention relates to an image processing apparatus, and particularly to an image processing apparatus for acquiring an image and creating a file corresponding to the acquired image.

2. Description of the Related Art

A variety of techniques for processing an image acquired with a scanner or the like have been conventionally disclosed. For example, Japanese Laid-Open Patent Publication No. 2005-157905 discloses a technique of converting read image data to vector data in an image processing apparatus. The image data is converted to vector data in a file format specified by a user, e.g., a word processing format, a table format or a presentation format.

According to the conventional technique, however, the user is required to specify a file format during the conversion, which may hamper a user's convenience.

SUMMARY OF THE INVENTION

The present invention was made in view of such circumstances, and an object of the present invention is to provide an image processing apparatus that facilitates operation of creating a file corresponding to an image.

According to an aspect, an image processing apparatus includes an acquisition unit configured to acquire an image, and a processing unit configured to select a format of a file corresponding to the image acquired by the acquisition unit, by analyzing a feature of the image. The processing unit is configured to create a file for each feature of the image in the selected format.

Preferably, the processing unit is configured to extract a graphic, a ruled line, an indent, or a character from the image acquired by the acquisition unit based on the feature of the image, and select the format of the file corresponding to the image based on a number or positional relation thereof.

Preferably, the processing unit is configured to select a table format as the format of the file corresponding to the image acquired by the acquisition unit, when a character or a graphic is within a ruled-line border in the image, select a document format as the format of the file corresponding to the image acquired by the acquisition unit, when a graphic, characters and a table are all present, and further when portions of the characters have starting positions aligned with each other by an indent, or when the portions of the characters have spacing of one character at their starting positions in the image, select a presentation format as the format of the file corresponding to the image acquired by the acquisition unit, when there is the same graphic or the same character included in the same position of all pages in the image, and select a graphic format as the format of the file corresponding to the image acquired by the acquisition unit, when there is only a graphic included in the image.

Preferably, the processing unit is configured to select a presentation format as the format of the file corresponding to the image acquired by the acquisition unit, when a first condition that there is the same graphic or the same character in the same position of all pages is satisfied in the image, select a table format as the format of the file corresponding to the image acquired by the acquisition unit, when the first condition is not satisfied, and when a second condition that a character or a graphic included in the image is completely within a ruled-line border is satisfied in the image, select a document format as the format of the file corresponding to the image acquired by the acquisition unit, when the first condition and the second condition are not satisfied, and when a third condition that the image includes only a character with an indent is satisfied in the image, and select a predetermined format as the format of the file corresponding to the image acquired by the acquisition unit, when none of the first condition, the second condition, and the third condition is satisfied in the image.

Preferably, the image processing apparatus further includes a storage device configured to store contents of setting for a format of a file. When the file created by the processing unit is stored in the storage device, the format corresponding to the contents of setting stored in the storage device is selected, instead of the format selected by the processing unit, as the format of the file.

Preferably, the processing unit is configured to create a file in a format corresponding to each page, for the image acquired by the acquisition unit.

Preferably, the processing unit is configured to create a file in a format corresponding to each portion having a feature, for the image acquired by the acquisition unit.

Preferably, the processing unit is configured to extract a ruled line from the image acquired by the acquisition unit, determine whether or not a character or a graphic included in the image acquired by the acquisition unit is within an area surrounded by the extracted ruled line, determine whether or not an image of a seal is located in the area surrounded by the ruled line or in the vicinity of the ruled line, and when it is determined that an image of a seal is located in the area surrounded by the ruled line or in the vicinity of the ruled line, exclude the image of the seal from objects of determination of whether or not it is within the area surrounded by the ruled line.

Preferably, the processing unit is configured to embed link information about the file created for each feature in the image of the created file.

Preferably, the processing unit is configured to generate a thumbnail image of each page of the acquired image, and generates information that associates the thumbnail image with the acquired image.

According to another aspect, a computer-readable recording medium non-temporarily recording a program executable by a computer for controlling an image processing apparatus is provided. The program causes the computer to perform acquiring an image, selecting a format of a file corresponding to the acquired image, by analyzing a feature of the image, and causing the image processing apparatus to create a file for each feature of the image in the selected format.

Preferably, the selecting includes extracting a graphic, a ruled line, an indent, or a character from the acquired image based on the feature of the image, and selecting the format of the file corresponding to the image based on a number or positional relation thereof.

Preferably, the selecting includes selecting a table format as the format of the file corresponding to the acquired image, when a character or a graphic is within a ruled-line border in the image, selecting a document format as the format of the file corresponding to the acquired image, when a graphic, characters and a table are all present, and further when portions of the characters have starting positions aligned with each other by an indent, or when the portions of the characters have spacing of one character at their starting positions in the image, selecting a presentation format as the format of the file corresponding to the acquired image, when there is the same graphic or the same character included in the same position of all pages in the image, and selecting a graphic format as the format of the file corresponding to the acquired image, when there is only a graphic included in the image.

Preferably, the selecting includes selecting a presentation format as the format of the file corresponding to the acquired image, when a first condition that there is the same graphic or the same character in the same position of all pages is satisfied in the image, selecting a table format as the format of the file corresponding to the acquired image, when the first condition is not satisfied, and when a second condition that a character or a graphic included in the image is completely within a ruled-line border is satisfied in the image, selecting a document format as the format of the file corresponding to the acquired image, when the first condition and the second condition are not satisfied, and when a third condition that the image includes only a character with an indent is satisfied in the image, and selecting a predetermined format as the format of the file corresponding to the acquired image, when none of the first condition, the second condition and the third condition is satisfied in the image.

Preferably, the image processing apparatus includes a storage device. The program further causes the computer of the image processing apparatus to perform storing contents of setting for a format of a file in the storage device, and causing the image processing apparatus to store the created file in the storage device. The selecting includes selecting the format corresponding to the contents of setting stored in the storage device, instead of the selected format, as the format of the file stored in the storage device.

Preferably, the creating a file includes creating a file in a format corresponding to each page, for the acquired image.

Preferably, the selecting a format includes acquiring a feature for each portion of the acquired image, and selecting a format corresponding to each portion. The created file is a file in a format corresponding to the feature of each portion.

Preferably, the selecting a format includes extracting a ruled line from the acquired image, determining whether or not a character or a graphic included in the acquired image is within an area surrounded by the extracted ruled line, and determining whether or not an image of a seal is located in the area surrounded by the extracted ruled line or in the vicinity of the ruled line. The determining whether or not a character or a graphic is within an area surrounded by the extracted ruled line includes excluding the image of the seal located in the area surrounded by the extracted ruled line or in the vicinity of the ruled line from objects of this determination.

Preferably, the creating a file includes embedding link information in the image of the created file, and the link information is information about the file created for each feature.

Preferably, the creating a file includes generating a thumbnail image of each page of the acquired image, and generating information that associates the thumbnail image with the acquired image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 schematically illustrates an example of an image acquired by the image processing apparatus.

FIG. 5 illustrates an example of the result of dividing the image of each page shown in FIG. 4.

FIG. 15 illustrates an example of a screen displayed on a display unit for selecting an application utilized with high priority, for a format corresponding to each feature.

FIG. 17 is a diagram for explaining the contents of processing in the image processing apparatus.

FIG. 18 illustrates an example of a screen for accepting an input of information for editing an image, which is displayed on the display unit of the image processing apparatus.

FIG. 20 is a flowchart of a process executed in a modification of the image processing apparatus shown in FIG. 1.

FIG. 21 is a flowchart of the process executed in the modification of the image processing apparatus shown in FIG. 1.

DESCRIPTION OF THE PREFERRED EMBODIMENTS

Figure 1:
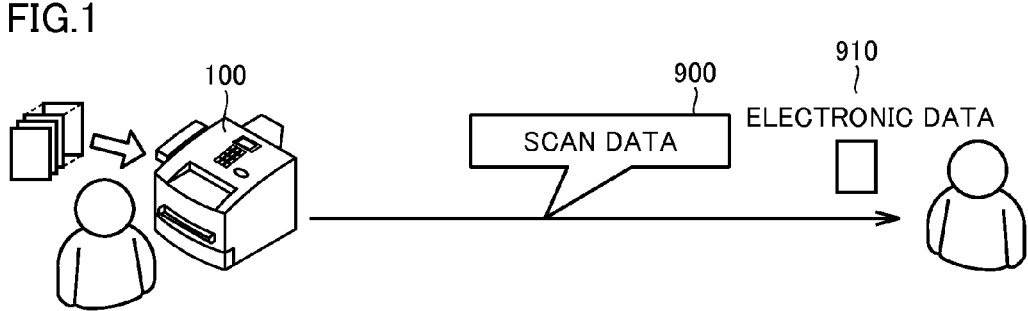
FIG. 1 schematically illustrates the configuration of an image processing system including an image processing apparatus according to an embodiment.

An image processing apparatus according to an embodiment will be described with reference to the drawings. It is noted that the same reference signs are used to identify elements having the same functions in the drawings, and descriptions thereof will not be repeated.

[Configuration of Image Processing System]

FIG. 1 schematically illustrates the configuration of an image processing system including an image processing apparatus according to this embodiment.

In the image processing system, an image processing apparatus 100 generates scan data 900 by scanning a document. Scan data 900 is data including an image of the document as it is, such as PDF (Portable Document Format) data. In addition, image processing apparatus 100 selects a format of a file based on a feature of the image in the document, and creates a file in the selected format (electronic data 910) for the image. Electronic data 910 corresponds to scan data 900 in a converted file format.

Then, image processing apparatus 100 provides scan data 900 and electronic data 910 to a user.

[Hardware Configuration of Image Processing Apparatus]

Figure 2:
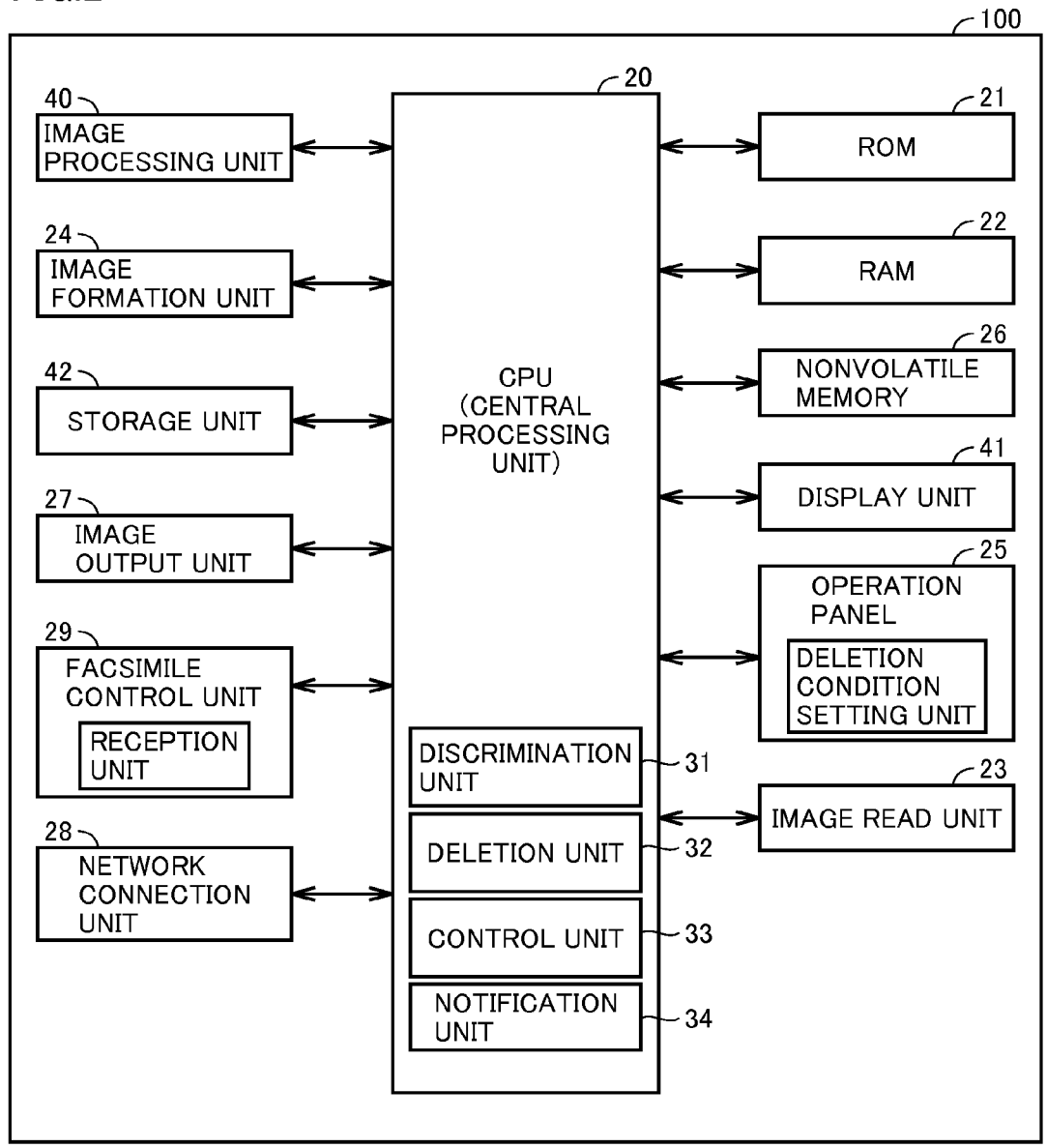
FIG. 2 schematically illustrates an example of hardware configuration of the image processing apparatus.

FIG. 2 schematically illustrates an example of hardware configuration of image processing apparatus 100.

Referring to FIG. 2, image processing apparatus 100 includes a CPU (Central Processing Unit) 20 which is an operation device for controlling the entire apparatus, a ROM (Read Only Memory) 21 for storing a program to be executed by CPU 20, a RAM (Random Access Memory) 22 for serving as a work area during execution of the program by CPU 20, a nonvolatile memory 26 and a storage unit 42 for storing a variety of data such as image data, a facsimile control unit 29 for transmitting the image data to an external terminal via public lines, an operation panel 25 for accepting operation of inputting information, a display unit 41 for displaying the information, and a network connection unit 28 formed of a network card and the like which is a communication interface with an external device.

The program to be executed by CPU 20 may be stored in storage unit 42. Storage unit 42 may be formed of a storage medium removable with respect to the body of image processing apparatus 100. Examples of the storage medium include media storing a program in a nonvolatile manner, such as a CD-ROM (Compact Disc Read Only Memory), a DVD-ROM (Digital Versatile Disc Read Only Memory), a USB (Universal Serial Bus) memory, a memory card, an FD (Flexible Disc), a hard disc, a magnetic tape, a cassette tape, an MO (Magnetic Optical Disc), an MD (Mini Disc), an IC (Integrated Circuit) card (except for a memory card), an optical card, a mask ROM, an EPROM, and an EEPROM (Electronically Erasable Programmable Read Only Memory).

CPU 20 includes a discrimination unit 31, a deletion unit 32, a control unit 33, and a notification unit 34, as its functions.

Discrimination unit 31 classifies a feature of each portion of an image, as will be described later.

When a graphic of a seal protrudes from a ruled-line border in an image, deletion unit 32 excludes the portion of the graphic from objects of prescribed determination, as will be described later. In the present specification, a ruled-line border may be referred to simply as "ruled line."

Control unit 33 controls operations of an image read unit 23, an image formation unit 24 and the like.

If an external storage device is specified as a place for storing scan data generated by image read unit 23, upon completion of generation of the scan data and creation of its corresponding file, notification unit 34 notifies that storage device of transmission of the data.

Image processing apparatus 100 further includes an image processing unit 40 for performing compression, analysis and the like of an image, image formation unit 24 for performing image formation operation of printing an image on a piece of paper, image read unit 23 for reading a document and generating image data, and an image output unit 27 for transmitting the image data generated by image read unit 23 to an external device.

An image to be processed in image processing apparatus 100 may be an image of data generated by image read unit 23, an image of data received by a reception unit in facsimile control unit 29, or an image of data received by network connection unit 28.

[Functional Configuration of Image Processing Apparatus]

Figure 3:
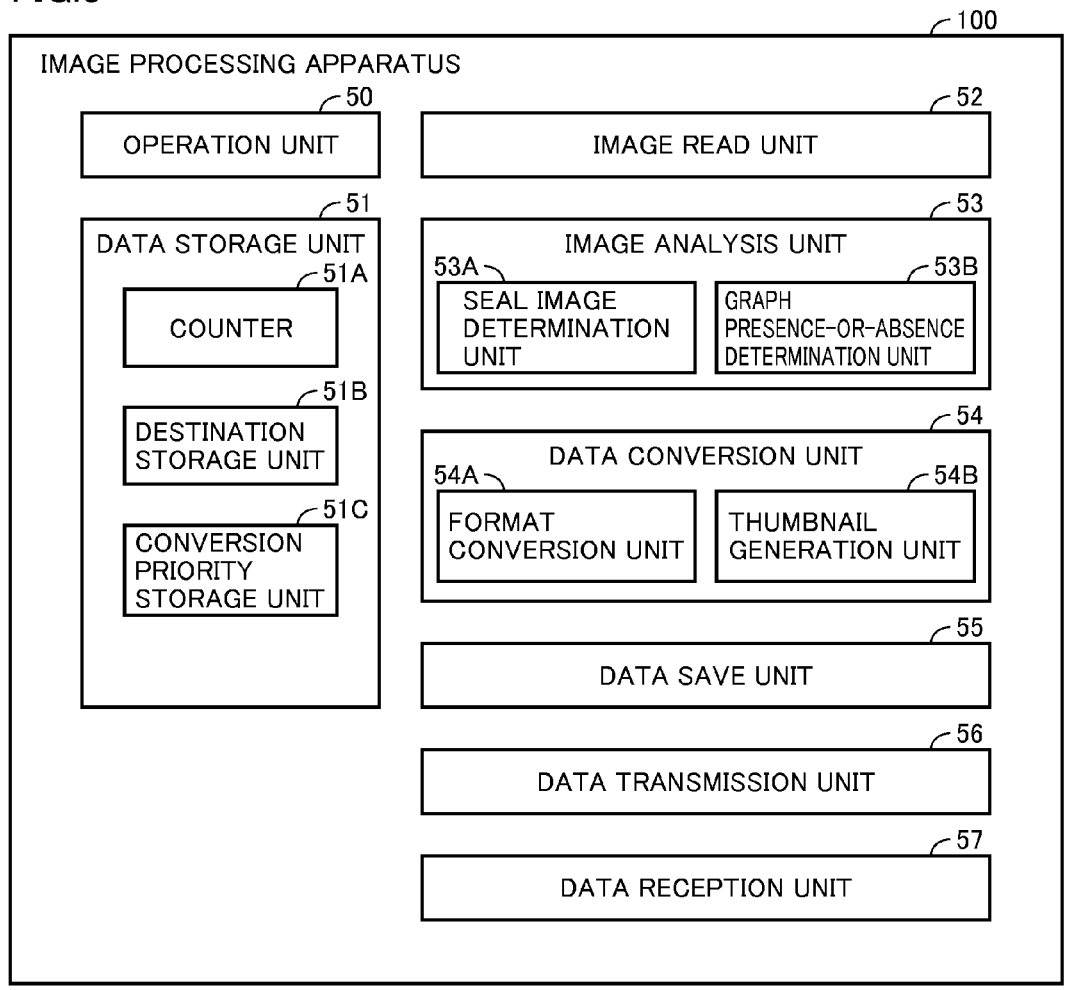
FIG. 3 schematically illustrates an example of functional configuration of the image processing apparatus.

FIG. 3 schematically illustrates an example of functional configuration of image processing apparatus 100.

Image processing apparatus 100 includes an operation unit 50 for accepting operation of inputting information from the user, as its function. Operation unit 50 is implemented by an operation button constituting operation panel 25, for example.

Image processing apparatus 100 further includes a data storage unit 51, an image read unit 52, an image analysis unit 53, a data conversion unit 54, a data save unit 55, a data transmission unit 56, and a data reception unit 57.

Data storage unit 51 stores the aforementioned image data (image file). In addition to file data such as the image file, data storage unit 51 stores a counter value indicating the number of pages that have been subjected to file conversion, destination data indicating a specified destination of a file created by the file conversion, and data indicating a conversion priority on a box-by-box basis (a plurality of storage areas defined in storage unit 42). A counter 51A stores the counter value. A destination storage unit 51B stores the destination data. A conversion priority storage unit 51C stores the data indicating the priority. Data storage unit 51 is implemented by storage unit 42.

Image read unit 52 corresponds to image read unit 23, and is implemented by a scanner, for example.

Image analysis unit 53 is implemented by CPU 20 executing an appropriate program, for example, and analyzes features of an image, as will be described later with reference to FIG. 9. Image analysis unit 53 includes a seal image determination unit 53A for making a determination of an image of a seal, and a graph presence-or-absence determination unit 53B for determining the presence or absence of a graph in an image.

Data conversion unit 54 includes a format conversion unit 54A for creating a file in a prescribed format from an image acquired by image read unit 52 (image read unit 23) and the like, and a thumbnail generation unit 54B for generating a thumbnail image of the image.

[Summary of File Creation Process]

FIG. 4 schematically illustrates an example of an image acquired by image processing apparatus 100. The "acquired image" as used herein corresponds to scan data 900 shown in FIG. 1.

Referring to FIG. 4, in this embodiment, scan data 900 includes a plurality of pages represented by pages 901 to 904. It is noted that scan data 900 may include only one page.

Image analysis unit 53 analyzes features of the image of each of pages 901 to 904, to divide the image of each page into the features. FIG. 5 illustrates an example of the result of dividing the image of each page shown in FIG. 4.

Image analysis unit 53 divides the image based on four types of features, namely, 1) character, 2) table, 3) graphic, and 4) template. In FIG. 5, each of pages 901 to 904 shown in FIG. 4 is illustrated as divided into the features.

Page 901 includes a template 801 and a character 802. Page 902 includes a template 811, characters 812, 814, and a table 813. Page 903 includes a template 821, tables 822, 824, and characters 823, 825. Page 904 includes a template 831, a graphic 832, and characters 833, 834.

The template refers to a character or a graphic arranged in the same position of all pages of scan data 900 (or pages including only such character or graphic). Template 811, template 821 and template 831 all include a character and an image the same as those of template 801.

A method of analyzing the features of the image (scan data 900) will be described later.

After dividing each page of the image based on the features as described above, image processing apparatus 100 selects file formats based on the features of the image, and converts the image to the formats to create new files. The files thus created are conversion data 750 to be described later.

Figure 6A:
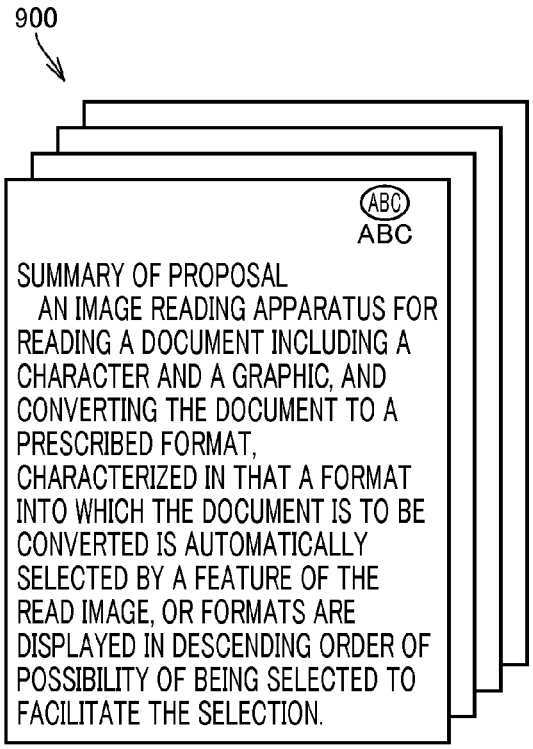
FIG. 6A illustrates an example of a file created by scanning the image in the image processing apparatus.
Figure 6C:
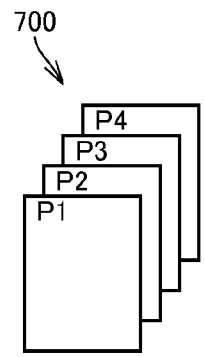
FIG. 6C illustrates an example of a file created by scanning the image in the image processing apparatus.
Figure 6B:
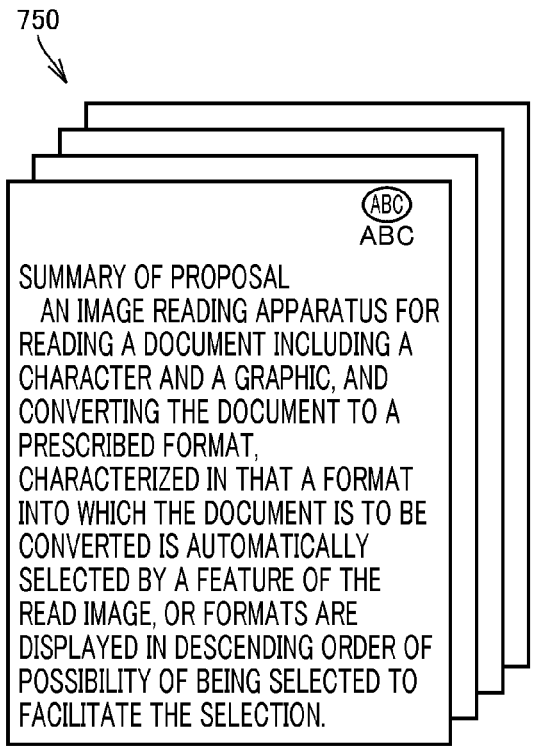
FIG. 6B illustrates an example of a file created by scanning the image in the image processing apparatus.

Furthermore, image processing apparatus 100 generates a thumbnail image of each page of the image. More specifically, image processing apparatus 100 generates scan data 900 of the image, then creates files in which the entire scan data 900 has been converted to prescribed formats, and further generates a thumbnail image of each page of scan data 900. FIGS. 6A to 6C illustrate an example of files created by scanning the image in image processing apparatus 100. Image processing apparatus 100 generates scan data 900 shown in FIG. 6A, conversion data 750 shown in FIG. 6B, and thumbnail data 700 shown in FIG. 6C, by scanning the image.

It is noted that image processing apparatus 100 may create a file for each portion where a feature has been detected in scan data 900.

Figure 7:
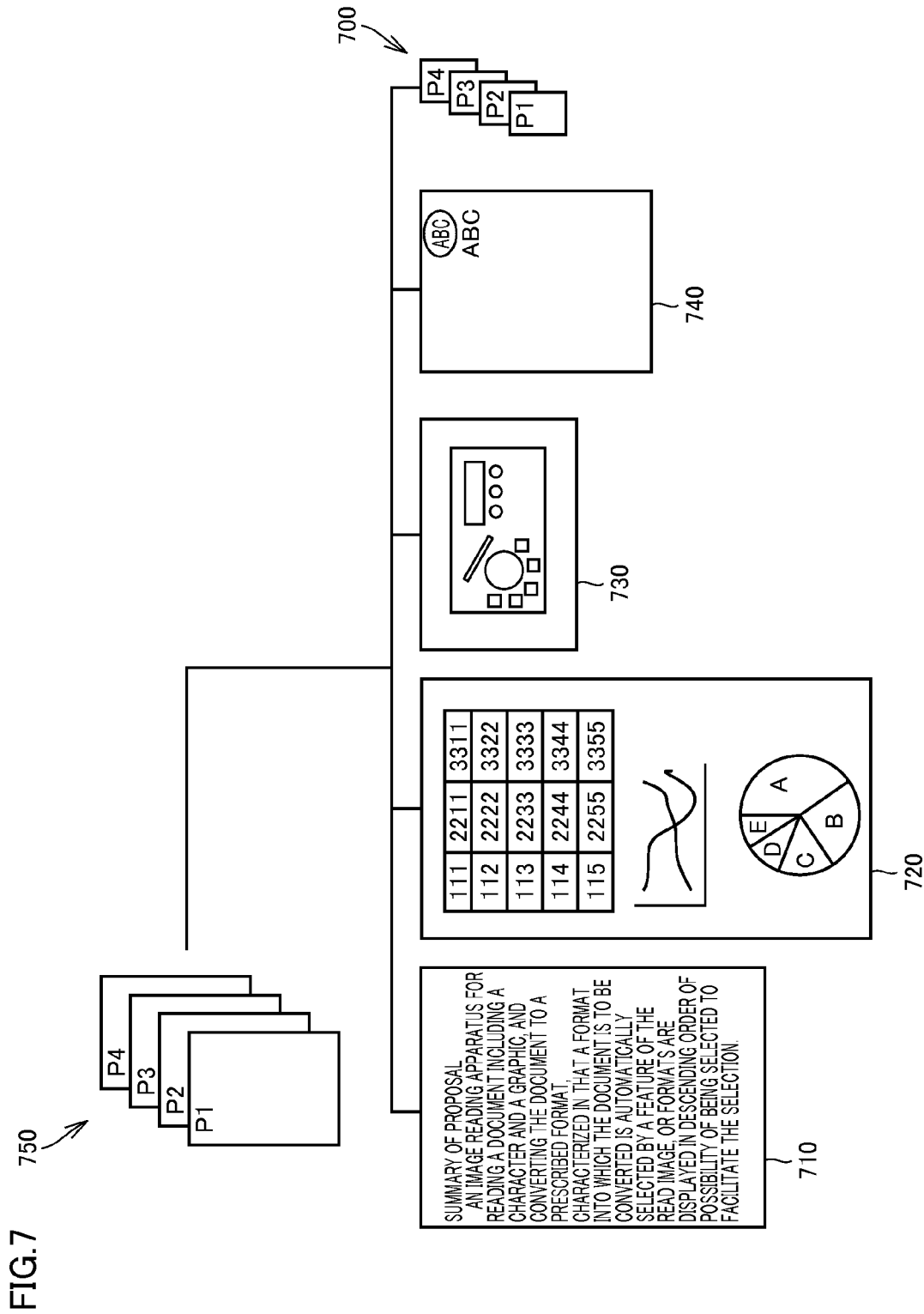
FIG. 7 illustrates an example of files created for features, respectively, for scan data.

As described above, image processing apparatus 100 divides the image of scan data 900 based on four types of features, namely, 1) character, 2) table, 3) graphic, and 4) template. Then, for scan data 900, image processing apparatus 100 creates a file for each feature, aside from conversion data 750. FIG. 7 illustrates an example of files created for the features, respectively, for scan data 900.

FIG. 7 shows files 710, 720, 730 and 740. File 710 is a file corresponding to portions where the feature of "character" has been detected, and includes characters 802, 812, 814, 823, 825, 833 and 834 shown in FIG. 5. For drawing convenience, FIG. 7 only shows the portion of character 802 as file 710.

File 720 is a file corresponding to portions where the feature of "table" has been detected, and includes tables 813, 822 and 824 shown in FIG. 5. File 730 is a file corresponding to a portion where the feature of "graphic" has been detected, and includes graphic 832 shown in FIG. 5. File 740 is a file corresponding to portions where the feature of "template" has been detected, and includes an image corresponding to template 801 shown in FIG. 5. Since templates 801, 811, 821 and 831 include the same combination of a character and a graphic, a file is created for only one of the templates.

Files 710, 720, 730 and 740 are in formats corresponding to their features, respectively. That is, file 710 is in document creation format, e.g., Microsoft Word® by Microsoft Corporation, which corresponds to the feature of "character". File 720 is in table creation format, e.g., Microsoft Excel® by Microsoft Corporation, which corresponds to the feature of "table." File 730 is in drawing format, e.g., Microsoft Visio® by Microsoft Corporation, which corresponds to the feature of "graphic." File 740 is in presentation format, e.g., Microsoft PowerPoint® by Microsoft Corporation, which corresponds to the feature of "template."

In other words, by scanning an image, image processing apparatus 100 may generate, in addition to scan data 900 of the image, conversion data 750, thumbnail data 700, and files 710, 720, 730 and 740 described above, as shown in FIG. 7.

In files 710, 720, 730 and 740, it is preferable that the portions forming these files be arranged according to page number in scan data 900. In other words, for the feature of "table," for example, if the pages are arranged in the order of pages 901, 902, 903 and 904 in scan data 900 as was shown in FIG. 5, then the tables will appear in the order of tables 813, 822 and 824. It is thus preferable that the portions be arranged in the order of tables 813, 822 and 824 in file 720 as well.

Figure 8:
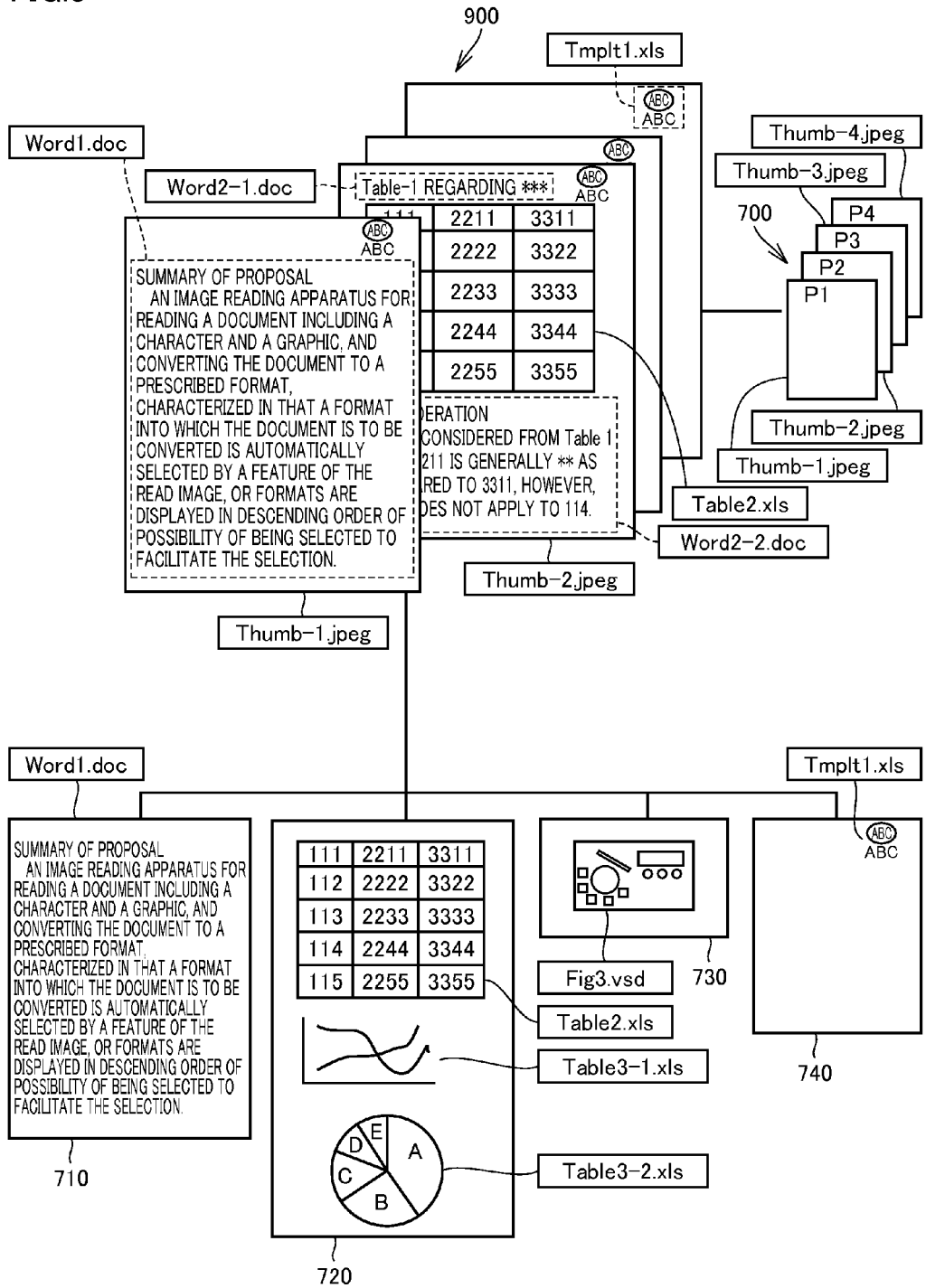
FIG. 8 is a diagram for explaining the contents of data on link information embedded in the scan data.

FIG. 8 is a diagram for explaining the contents of data on link information embedded in scan data 900.

Referring to FIG. 8, it is preferable that each page of scan data 900 be associated with thumbnail data corresponding to each page of thumbnail data 700. In the example shown in FIG. 8, file names of "Thumb-1.jpeg," "Thumb-2.jpeg," "Thumb-3.jpeg" and "Thumb-4.jpeg" are assigned to the pages of thumbnail data 700, respectively. FIG. 8 shows a state where each page of scan data 900 is associated with the file name of a corresponding page of thumbnail data 700. "Being associated" means being incorporated in the data of each page of scan data 900 as tag information, or by being described in a color invisible when printed.

Of course, instead of the incorporation in scan data 900, information that associates scan data 900 with thumbnail data 700 may be separately generated and stored in storage unit 42. The associated data may include not only the file names but also storage places for storing the thumbnail images.

When printing each page of scan data 900, CPU 20 may generate information (link information) that associates scan data 900 with thumbnail data 700 as described above. Then, CPU 20 may print each page of scan data 900 together with the link information. In this case, the link information may be printed in the same type of color as a print sheet or in a color similar to the print sheet inconspicuously together with the image of each page of scan data 900, or may be printed on a side (back side) different from the side on which the image of each page of scan data 900 is printed.

As described above, files 710, 720, 730 and 740 are files created by dividing scan data 900 into the features. It is preferable that the pages of scan data 900 be further associated with the link information about files 710, 720, 730 and 740, respectively. FIG. 8 shows a state where each area where a feature has been detected is associated with a file name such as "Word1.doc," "Table2.xls" or the like as the link information in the pages of scan data 900.

In this embodiment, a file may be created for each portion where a feature has been detected in scan data 900 (e.g., character 802, table 813, graphic 832 shown in FIG. 5). In other words, a file may be created in character creation format for each of characters 802, 812, 814, 823, 825, 833 and 834, for example. In addition, a file may be created in table creation format for each of tables 813, 822 and 824 shown in FIG. 5. In this case, "Table2.xls," "Table3-1.xls" and "Table3-2.xls" refer to files independent of one another, although they are described to indicate a single file together in FIG. 8. Scan data 900 stores, for each file, the link information associated with its corresponding portion in scan data 900.

[Contents of File Creation Process]

Figure 9:
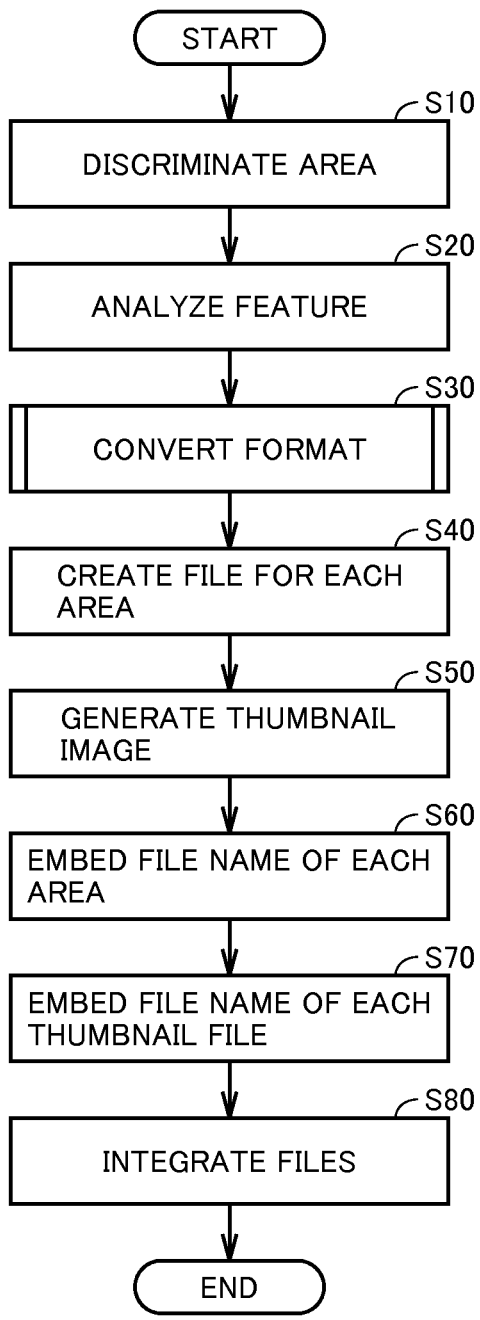
FIG. 9 is a flowchart of a file creation process executed by the image processing apparatus.

FIG. 9 is a flowchart of the file creation process executed by CPU 20. CPU 20 is started in response to, for example, operation of a prescribed operation unit such as a file conversion button on operation panel 25, arrival of a predetermined time, or reception of an instruction to start the file creation process from an external device via network connection unit 28.

Referring to FIG. 9, first, in step S10, CPU 20 causes image read unit 23 (image read unit 53, i.e., a scanner) to generate scan data 900, and then performs area discrimination. CPU 20 then causes the process to proceed to step S20. The area discrimination refers to a process of dividing the image of each page of scan data 900 into areas assumed to include a feature, as was shown in FIG. 5.

In step S20, CPU 20 analyzes the features of the areas obtained by the division in step S10. CPU 20 then causes the process to proceed to step S30. As a result, each area is classified as one of character, table and graphic. A known technique may be employed to extract and classify the portions of character, table, graphic and template from the image, and therefore the detailed description thereof will not be repeated.

In step S30, CPU 20 converts the format of scan data 900, and causes the process to proceed to step S40. The format conversion as used herein means generating data in a different file format, and corresponds to the generation of conversion data 750 described above.

Figure 10:
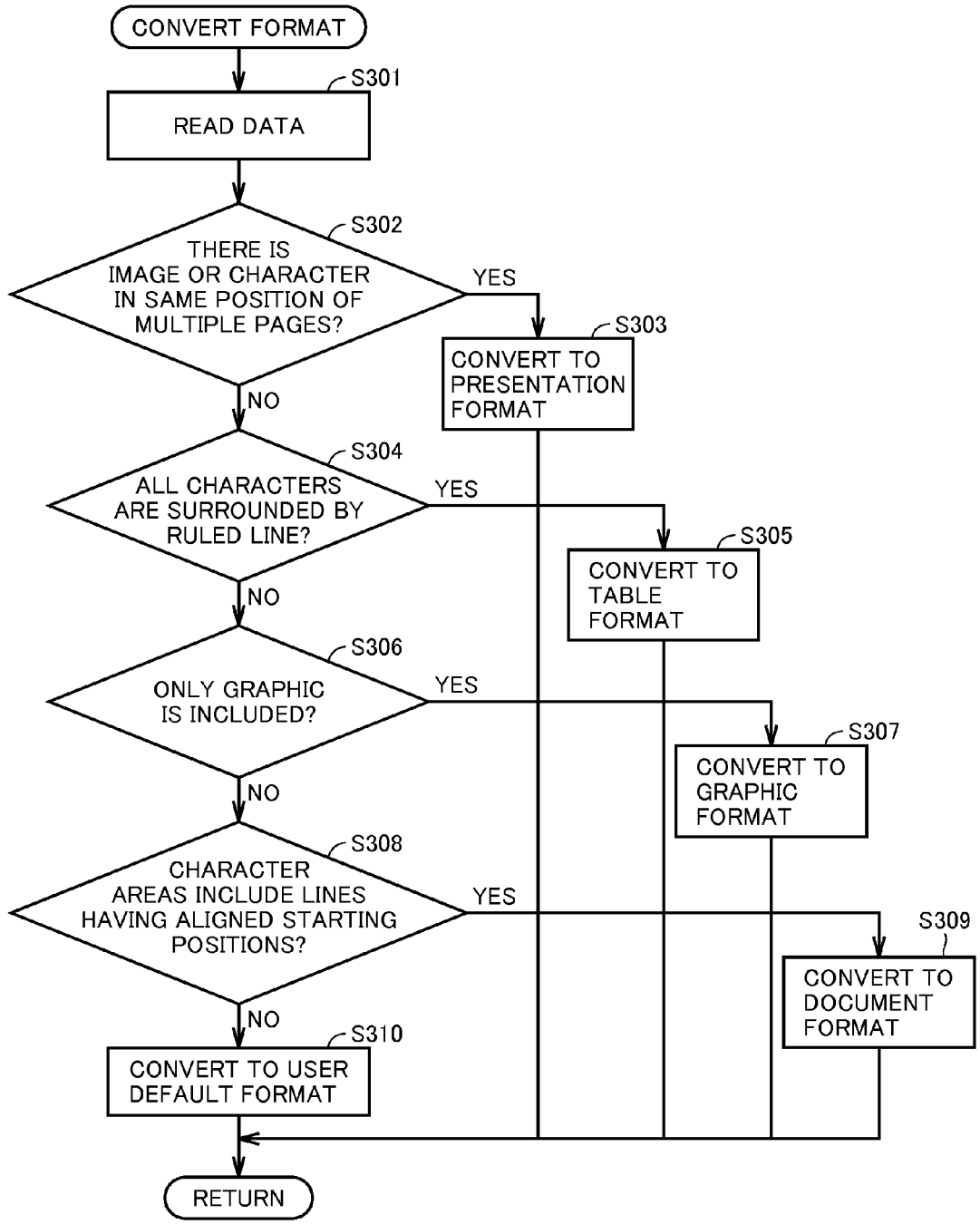
FIG. 10 is a flowchart of a subroutine of a part of the process shown in FIG. 9.

FIG. 10 is a flowchart of a subroutine of step S30. Referring to FIG. 10, the contents of processing of step S30 will be described.

Referring to FIG. 10, first, in step S301, CPU 20 reads scan data 900 and the result of analysis conducted in step S20. CPU 20 then causes the process to proceed to step S302.

In step S302, CPU 20 determines whether or not there is the same graphic or the same character in the same position of a plurality of pages, and causes the process to proceed to step S303 if it is determined that it exists, or otherwise causes the process to proceed to step S304.

On pages 901 to 904 shown in FIG. 5, for example, a graphic of an ellipse surrounding the characters of "ABC" is arranged at the upper right of each page. In addition, the characters of "ABC" are arranged at the upper right of each page. In this case, the process proceeds from step S302 to step S303.

In step S303, CPU 20 determines that a format (file format) into which scan data 900 is to be converted is a presentation format, creates a file in that format as conversion data 750, and returns to the process shown in FIG. 9.

In step S304, CPU 20 determines whether or not all characters included in scan data 900 are surrounded by a ruled line, and causes the process to proceed to step S305 if it is determined that they are surrounded, or otherwise causes the process to proceed to step S306. That "characters are surrounded by a ruled line" as used herein means that the characters are located in a ruled-line border.

If the scan data includes only a table such as table 813 shown in FIG. 5, for example, the process proceeds from step S304 to step S305.

In step S305, CPU 20 determines that a format (file format) into which scan data 900 is to be converted is a table creation format, creates a file in that format as conversion data 750, and causes the process to return to the processing shown in FIG. 9.

In step S306, CPU 20 determines whether or not scan data 900 includes only a graphic. CPU 20 causes the process to proceed to step S307 if it is determined that the data includes only a graphic, or otherwise causes the process to proceed to step S308.

If the scan data includes only a graphic such as graphic 832 shown in FIG. 5, for example, the process proceeds from step S306 to step S307.

In step S307, CPU 20 determines that a format (file format) into which scan data 900 is to be converted is a drawing format, creates a file in that format as conversion data 750, and returns to the process shown in FIG. 9.

In step S308, CPU 20 determines whether or not a plurality of character areas have starting positions aligned with each other in scan data 900, and causes the process to proceed to step S309 if it is determined that they have it, or otherwise causes the process to proceed to step S310.

Figure 11:
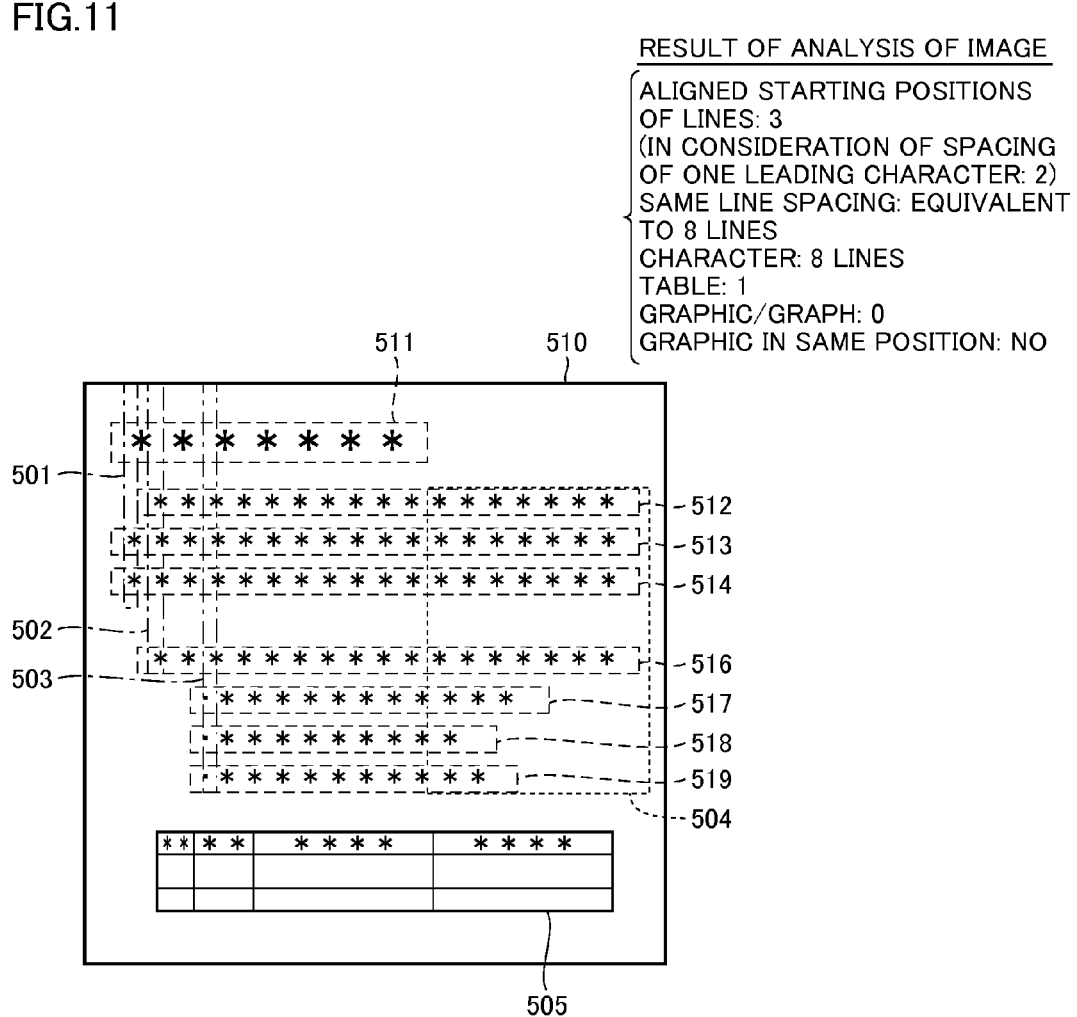
FIG. 11 illustrates an example of scan data.

FIG. 11 illustrates an example of scan data. Scan data 510 in FIG. 11 includes eight character areas (character areas 511 to 514, 516 to 519), and a table 505.

A position 501 indicates a starting position of character areas 513 and 514. In other words, these character areas have starting positions (horizontal position at the left end of each character area in a state where the characters are positionally correct in the scan data) aligned with each other. In this case, therefore, the process proceeds from step S308 to step S309. In FIG. 11, a position 502 indicates a starting position of character areas 512 and 516. In other words, these character areas also have starting positions aligned with each other. A position 503 indicates a starting position of character areas 517, 518 and 519. In other words, these character areas also have starting positions aligned with each other.

Referring back to FIG. 10, in step S309, CPU 20 determines that a format (file format) into which scan data 900 is to be converted is a document creation format, creates a file in that format as conversion data 750, and causes the process to return to the processing shown in FIG. 9.

In step S310, CPU 20 determines that a format (file format) into which scan data 900 is to be converted is a predetermined (user default) format, creates a file in that format as conversion data 750, and causes the process to return to the processing shown in FIG. 9.

Referring back to FIG. 9, after converting the format of the scan data in step S30, CPU 20 creates a file for each area of the scan data in step S40, and causes the process to proceed to step S50. In step S40, specifically, CPU 20 saves the areas detected in step S10 in separate files in formats corresponding to the features of the areas, respectively. This leads to the creation of files 710, 720, 730 and 740 as was described with reference to FIG. 7.

In step S50, CPU 20 generates a thumbnail image of each page of scan data 900, and causes the process to proceed to step S60.

In step S60, CPU 20 generates the link information as was described with reference to FIG. 8 for the files created in step S40, saves the information in association with the portions of scan data 900, and causes the process to proceed to step S70.

In step S70, CPU 20 generates the link information as was described with reference to FIG. 8 for the files of the thumbnail images generated in step S50, saves the information in association with the portions of scan data 900, and causes the process to proceed to step S80.

In step S80, CPU 20 integrates scan data 900, conversion data 750 generated in step S30, the files created for the features in step S40 (e.g., files 710, 720, 730 and 740), and thumbnail data 700 generated in step S50, and ends the process shown in FIG. 9.

In the embodiment described above, for scan data 900, a format (file format) into which scan data 900 is to be converted is selected based on the result of analysis of a feature of the image specified by the data. The object to be analyzed is not limited to the data generated by image read unit 23, but may be an image file received from another device.

Furthermore, in this embodiment, examples of a basis for selecting a file format includes the number (whether only that one is included, etc.) or positional relation of a graphic, a ruled line or an indent (line head position of a character area), as was described with reference to FIG. 11.

In the process described with reference to FIG. 9, an image to be processed such as scan data 900 is analyzed, followed by the division of the image, the selection of a target format, and the like, based on the result of analysis.

In step S20, in addition to the classification of the areas, a result of analysis of a certain item for the image to be processed may be detected. An example of such result of analysis is described.

As a result of analysis of scan data 510 shown in FIG. 11, it is shown that there are three portions having line head positions aligned with each other. Furthermore, as a result of analysis on the assumption that a first line of a paragraph is indented one character with respect to the other lines, it is shown that there are two portions having line head positions aligned with each other.

As a result of further analysis, it is shown that there are eight lines of characters determined to have the same line spacing, eight lines determined to be characters, one portion determined to be a table, and zero portion determined to be a graphic or a graph. As to whether or not there is a graphic (or a character) in the same position of a plurality of pages included in the image, the result is "NO."

Figure 12:
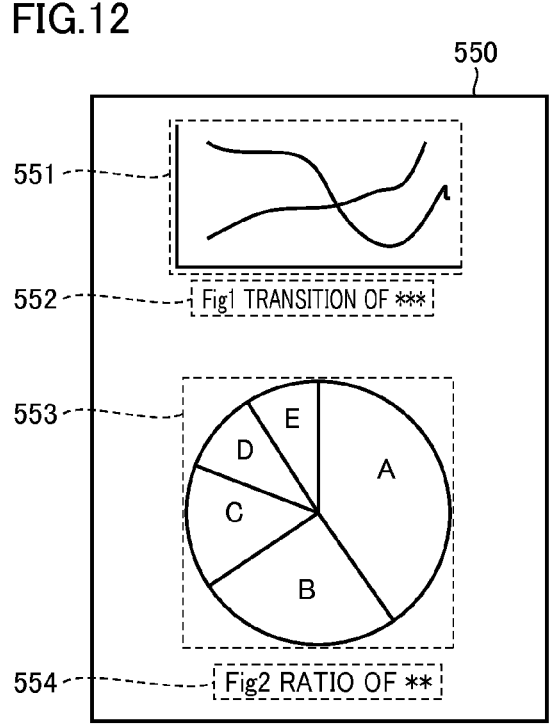
FIG. 12 illustrates an example of the result of another analysis compared to the result of analysis shown in FIG. 11.

FIG. 12 illustrates an example of the result of another analysis. Scan data 550 is shown in FIG. 12. FIG. 12 shows a state where, as a result of the area discrimination in step S10, a table 551, a character 552, a table 553 and a character 554 have been detected in scan data 550.

As a result of detection on scan data 550, there is zero portion having line head positions aligned with each other. Furthermore, as a result of analysis on the assumption that a first line of a paragraph is indented one character with respect to the other lines, it is shown that there are two portions having line head positions aligned with each other. Furthermore, it is shown that there is zero line of characters determined to have the same line spacing, two lines determined to be characters, zero portion determined to be a table, and two portions determined to be a graphic or a graph. As to whether or not there is a graphic (or a character) in the same position of a plurality of pages included in the image, the result is "NO."

Figure 13:
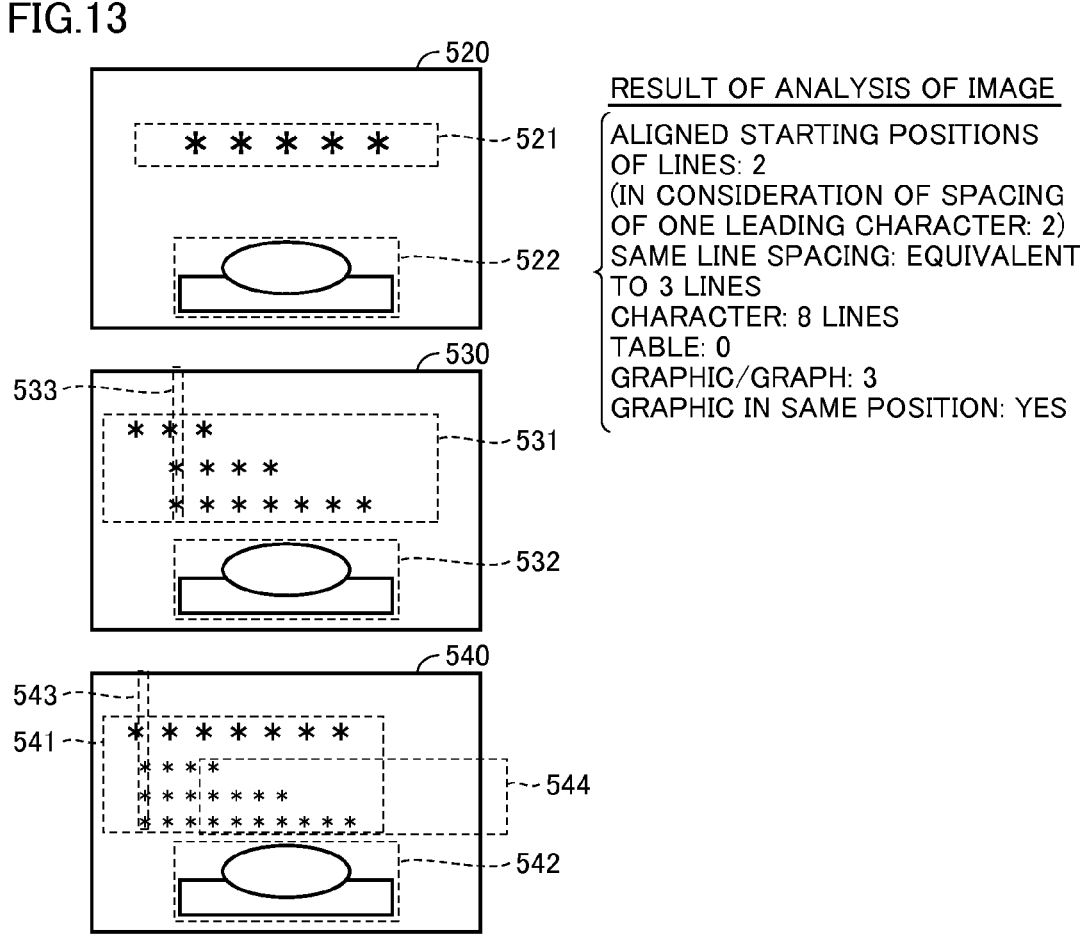
FIG. 13 illustrates an example of the result of yet another analysis compared to the result of analysis shown in FIG. 11.

FIG. 13 illustrates an example of the result of yet another analysis. An image illustrated in FIG. 13 includes three pages 520, 530 and 540.

As a result of area discrimination, page 520 includes a character 521 and a graphic 522. Page 530 includes a character 531 and a graphic 532. Page 540 includes a character 541 and a graphic 542.

As a result of detection on the image (pages 520, 530 and 540) shown in FIG. 13, there are two portions having line head positions aligned with each other. These line head positions are represented as a position 533 in character 531, and a position 543 in character 541. Furthermore, as a result of analysis on the assumption that a first line of a paragraph is indented one character with respect to the other lines, it is shown that there are two portions having line head positions aligned with each other. This is based on the fact that a second line of character 531 (portion one line below the top line of character 531) is indented (positioned to the right) about one character with respect to a first line of character 531 (the top line of character 531), and that a second line of character 541 (portion one line below the top line of character 541) is indented (positioned to the right) about one character with respect to a first line of character 541 (the top line of character 541).

Furthermore, FIG. 13 shows that there are three lines of characters determined to have the same line spacing. This is based on the fact that the spacing (spacing with which the characters are vertically arranged) between characters included in an area 544 on page 540 is constant. Moreover, FIG. 13 shows that there are eight lines determined to be characters, zero portion determined to be a table, and three portions determined to be a graphic or a graph. As to whether or not there is a graphic (or a character) in the same position of a plurality of pages included in the image, the result is "YES." This is based on the fact that pages 520, 530 and 540 include graphics 522, 532 and 542 having the same shape, respectively. In other words, graphics 522, 532 and 542 are a template.

Furthermore, in this embodiment, if a graph is detected in the image to be processed (scan data), the graph may be saved not only as a graphic but also as data.

If a circle graph or a bar graph is detected as a graph, for example, a table may be created that includes character strings described in areas of the circle graph or bar graph as items, and numerical values corresponding to the ratios of the areas as values, and may be saved in association with the image of the graph. In this case, based on the image of a circle graph such as shown in FIG. 14A, a table such as shown in FIG. 14B is created.

Figures 14A, 14B:
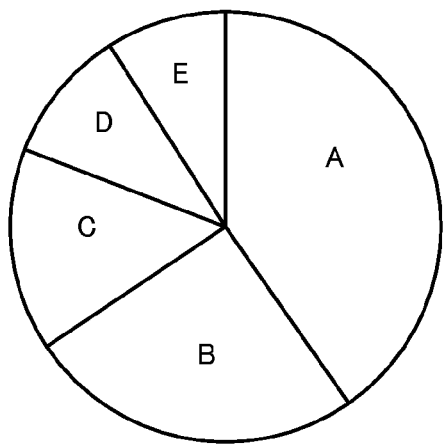
FIG. 14A is a diagram for explaining the contents of processing in the image processing apparatus.
FIG. 14B is a diagram for explaining the contents of processing in the image processing apparatus.

In the table shown in FIG. 14B, the characters of "A", "B", "C", "D" and "E" described in the areas of the circle graph shown in FIG. 14A are listed as items. Each item is associated with a value corresponding to its angle relative to the total of 100. If numerical values are described in the areas of a graph (if numerical values are recognized by character recognition), those numerical values may be used as values associated with items in a created table.

CPU 20 determines that the image includes a circle graph based on, for example, the detection of a circle in the image, and further the detection of one or more straight lines in the circle that extend outward from the center of the circle.

In addition, the user can set a format corresponding to each feature. FIG. 15 illustrates an example of a screen displayed on display unit 41 for selecting an application utilized with high priority, for a format corresponding to each feature.

The screen illustrated in FIG. 15 shows three application names of "Document creation 1," "Document creation 2" and "Document creation 3," as applications for document creation. The screen also shows three application names of "Table creation 1," "Table creation 2" and "Table creation 3," as applications for table creation. The screen further shows three application names of "Graphic creation 1," "Graphic creation 2" and "Graphic creation 3," as applications for graphic creation (drawing).

On this screen, CPU 20 accepts the selection of applications for document creation, table creation and graphic creation, respectively. Then, in step S309, step S305 and step S307, files of the selected applications are created, respectively.

When determining whether or not all characters included in scan data 900 are surrounded by a ruled line in the description above, a particular type of graphic may be handled in a special manner. More specifically, a particular type of graphic may be handled as being within a ruled-line border even if it protrudes from the border. Alternatively, a particular type of graphic may be handled exceptionally by being excluded from objects of determination in step S304.

Figure 16A:
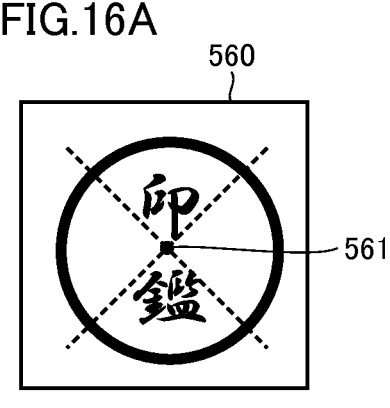
FIG. 16A is a diagram for explaining the contents of processing in the image processing apparatus.

One such particular type of graphic is a seal (name stamp) such as shown in FIG. 16A. Whether or not an image included in scan data 900 includes a graphic of a seal is determined based on whether or not scan data 900 includes a portion having an outline of a red closed loop. If the outline of the portion is a graphic of a red closed loop, the portion is handled as a graphic of a seal, otherwise the portion is handled as not a graphic of a seal. A center 561 shown in FIG. 16A and a center 562 shown in FIG. 16B each represent a center of a graphic determined to be a graphic of a seal.

Figure 16B:
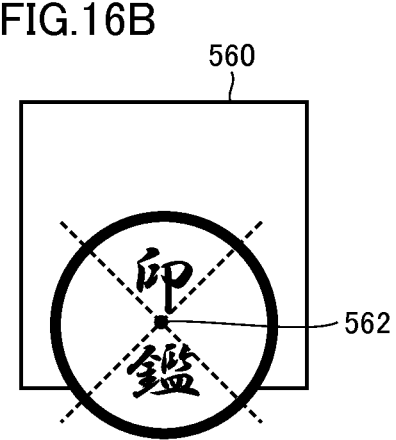
FIG. 16B is a diagram for explaining the contents of processing in the image processing apparatus.

If the graphic of a seal is within a ruled line 560 as shown in FIG. 16A, it is regarded as an object of determination in step S304 and the like. If the graphic protrudes from ruled line 560 as shown in FIG. 16B, it is excluded from objects of determination described above.

In the embodiment described above, a format in which conversion data 750 is generated is selected in accordance with a feature of the image. A manner in which a format is selected may be represented as a table such as shown in FIG. 17, for example.

Referring to FIG. 17, if there is the same graphic or character on the pages, a presentation format is selected.

If there is no same graphic or character on the pages, and if there is a character only within a ruled line, a table format is selected.

If there is no same graphic or character on the pages, if there is no ruled line or there is a character outside of the ruled line as well, and if only a graphic is included, a graphic (drawing) format is selected.

If there is no same graphic or character on the pages, if there is no ruled line or there is a character outside of the ruled line as well, if an element other than a graphic is also included, and if there are portions of characters having starting positions aligned with each other, a document format is selected.

First Modification

When a file is created in each format as described above, image processing apparatus 100 can accept an input of information for editing an image subjected to scanning and the like.

FIG. 18 illustrates an example of a screen for accepting an input of information for editing an image, which is displayed on display unit 41.

Referring to FIG. 18, screen 400 includes a display column 420 for displaying a thumbnail image of each page included in the image, and a display column 410 for displaying a page to be edited. Display column 410 displays a page 450 to be edited.

The user selects one page from the thumbnail images displayed in display column 420. As a result, the selected page in scan data 900 is displayed in display column 410.

Display column 410 displays buttons 411 to 414. Buttons 411 to 414 are buttons for selecting a feature. In this embodiment, elements included in the image (scan data) are classified into four types of features, namely, 1) character, 2) table, 3) graphic, and 4) template. Buttons 411, 412, 413 and 414 correspond to character, table, graphic and template, respectively.

As was described with reference to FIG. 8, each area is associated with a feature in scan data 900.

When one of buttons 411 to 414 is selected to select a feature on screen 400, CPU 20 causes a portion associated with the selected feature to be displayed conspicuously with respect to the other portions, on the page displayed in display column 410.

In FIG. 18, button 412 is operated to select the table format, causing a portion determined to be a table on page 450 to be displayed conspicuously with respect to the other portions. Specifically, in FIG. 18, the portions other than the table are grayed out on page 450.

Second Modification

In the embodiment described above, a portion corresponding to each detected feature is extracted from the scan data, to create the files such as files 710, 720, 730 and 740.

Figure 19:
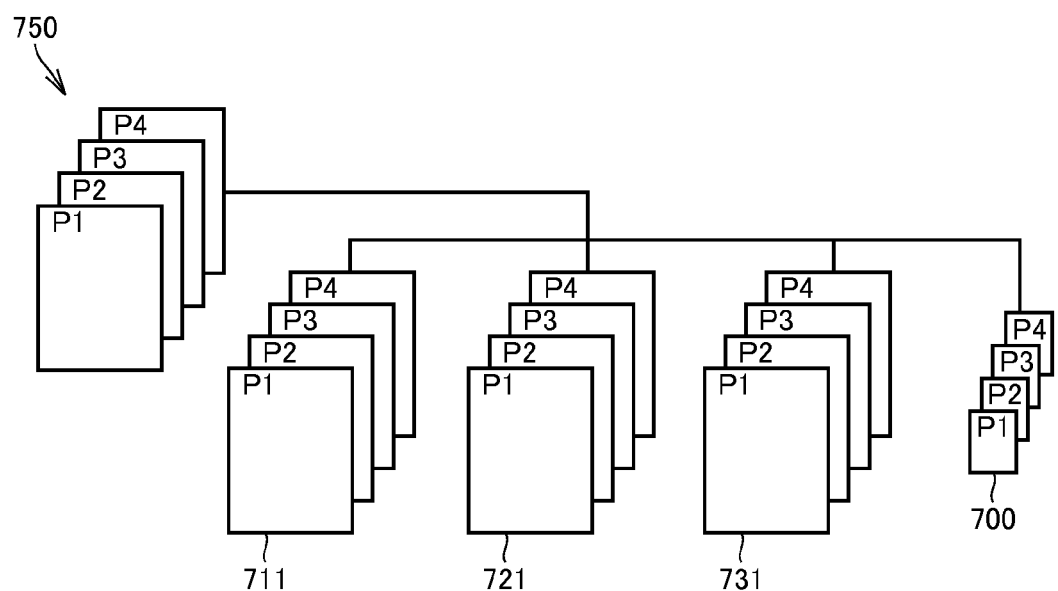
FIG. 19 is a diagram for explaining the contents of data generated in the image processing apparatus.

It is noted that a file in each format may be created for the entire scan data. In other words, if conversion data 750 in presentation form is generated for all pages of the scan data, as shown in FIG. 19, for example, files 711, 721 and 731 corresponding to all pages of the scan data are created in the other formats (document creation format, table format and drawing format) as well. In this case, scan data 900, conversion data 750, files 711, 721, 731 and thumbnail data 700 are associated with one another and saved in storage unit 42 and the like.

Third Modification

In image processing apparatus 100, when scan data is generated by reading an image with the scanner (image read unit 23), a format of a file to be created may be determined in accordance with the contents specified as a place for storing the scan data. FIGS. 20 and 21 are flowcharts of a process executed by image processing apparatus 100 in this modification.

Referring to FIG. 20, in this modification, CPU 20 performs operation in from step S10 through to step S80 in a manner similar to the processing as was described with reference to FIG. 9, and then further in step S90, forcibly converts the format (file format). FIG. 21 illustrates a subroutine of operation in step S90.

Referring to FIG. 21, in step S901, CPU 20 determines whether or not a box (storage area defined by storage unit 42) has been specified as a place for storing the scan data, and causes the process to proceed to step S902 if it is determined that a box has been specified, or to step S906 if it is determined that another component (e.g., a storage device other than image processing apparatus 100) has been specified as the storing place.

In step S906, CPU 20 determines whether or not the format of a file created in accordance with the scan data has been specified for the specified storing place, and causes the process to proceed to step S907 if it is determined that the format has been specified, or otherwise causes the process to proceed to the process shown in FIG. 20. In image processing apparatus 100, information such as a table that associates an external storage device with a file format is stored in storage unit 42, for example. In step S906, CPU 20 retrieves that information to determine whether or not the specified storing place has been associated with a file format.

In step S907, CPU 20 creates a file in the format specified in that information for all pages of the scan data, and returns to the process shown in FIG. 20.

In step S902, CPU 20 determines whether or not the format of a file created in accordance with the scan data has been specified for the specified box, and causes the process to proceed to step S904 if it is determined that the format has been specified, or otherwise causes the process to proceed to step S903. In image processing apparatus 100, information such as a table that associates at least a part of the plurality of boxes in image processing apparatus 100 with a file format is stored in storage unit 42, for example. In step S902, CPU 20 retrieves that information to determine whether or not the box specified as a place for storing the scan data has been associated with a file format.

In step S904, CPU 20 creates a file in the format determined to have been specified in step S902 for all pages of the scan data, and causes the process to return to the processing shown in FIG. 20.

In step S903, CPU 20 determines whether or not the setting of holding a file format inherent in the specified box has been made. Specifically, if the specified box is a so-called shared folder that allows saving, deletion and the like of a file by a plurality of users, for example, the setting of holding a file format inherent in the box may be the setting of holding files in all formats that can be created in image processing apparatus 100. The process proceeds to step S905 if it is determined that such setting has been made, or otherwise returns to the process shown in FIG. 20.

In step S905, CPU 20 creates files in all formats that can be created in image processing apparatus 100 for all pages of the scan data, and returns to the process shown in FIG. 20. In this case, for example, for the scan data, files in presentation format, document format, table creation format and drawing format corresponding to all pages of the scan data are created, as was described with reference to FIG. 19.

BRIEF DESCRIPTION OF EMBODIMENT

According to the embodiment described above, the user can convert data of a document to a reusable file format such as the editable one (see FIG. 18), simply by reading the document with image processing apparatus 100. Likewise, the user can convert an image of data transmitted to image processing apparatus 100 from another device to such file format.

Furthermore, as was described with reference to FIG. 19 and the like, data in a plurality of file formats can be simultaneously had for the image. This facilitates isolation of a file format required by the user from the other file formats, which allows easy editing of data in the required format.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
an acquisition unit configured to acquire an image; and
a processing unit configured to
(i) analyze features of said acquired image;
(ii) classify each analyzed feature of said acquired image;
(iii) select a file format for each of the analyzed features of the acquired image
(iv) generate a new file in each selected file format; and
(v) include, in each generated new file of a selected file format, respective features of said acquired image.

2. The image processing apparatus according to claim 1, wherein said processing unit is configured to extract a graphic, a ruled line, an indent, or a character from the acquired image based on the analyzed feature of the image, and select the format of the file corresponding to the image based on a number or positional relation thereof.

3. The image processing apparatus according to claim 1, wherein said processing unit is further configured to:
select a table format as the file format, when a character or a graphic is within a ruled-line border in the image;
select a document format as the file format, when a graphic, characters and a table are all present, and further when portions of the characters have starting positions aligned with each other by an indent, or when the portions of the characters have spacing of one character at their starting positions in the image;
select a presentation format as the file format, when there is the same graphic or the same character included in the same position of all pages in the image; and
select a graphic format as the file format, when there is only a graphic included in the image.

4. The image processing apparatus according to claim 1, wherein said processing unit is further configured to:
select a presentation format as the file format, when a first condition that there is the same graphic or the same character in the same position of all pages is satisfied in the image;
select a table format as the file format, when said first condition is not satisfied, and when a second condition that a character or a graphic included in the image is completely within a ruled-line border is satisfied in the image;
select a document format as the file, when said first condition and said second condition are not satisfied, and when a third condition that said image includes only a character with an indent is satisfied in the image; and
select a predetermined format as the file format, when none of said first condition, said second condition, and said third condition is satisfied in the image.

5. The image processing apparatus according to claim 1, further comprising;
a storage device configured to store contents of setting for a file format, wherein when the new file created by said processing unit is stored in said storage device, said format corresponding to said contents of setting stored in said storage device is selected, instead of said format selected by said processing unit, as the format of the file.

6. The image processing apparatus according to claim 1, wherein said processing unit is further configured to create a file in a format corresponding to each page, for the image acquired by said acquisition unit.

7. The image processing apparatus according to claim 6, wherein said processing unit is further configured to create a file in a format corresponding to each portion having a feature, for the image acquired by said acquisition unit.

8. The image processing apparatus according to claim 1, wherein said processing unit is further configured to extract a ruled line from the image acquired by said acquisition unit, determine whether or not a character or a graphic included in the image acquired by said acquisition unit is within an area surrounded by extracted said ruled line, determine whether or not an image of a seal is located in the area surrounded by said ruled line or in the vicinity of said ruled line, and when it is determined that an image of a seal is located in the area surrounded by said ruled line or in the vicinity of said ruled line, exclude the image of the seal from objects of determination of whether or not it is within the area surrounded by said ruled line.

9. The image processing apparatus according to claim 1, wherein said processing unit is further configured to embed, in the image of a created new file, link information about said file created for a respective feature in the acquired image.

10. The image processing apparatus according to claim 1, wherein said processing unit is further configured to generate a thumbnail image of each page of said acquired image, and generates information that associates said thumbnail image with said acquired image.

11. The image processing apparatus according to claim 1, wherein the acquisition unit is a scanner.

12. A non-transitory computer-readable recording medium recording a program executable by a computer for controlling an image processing apparatus, said program causing said computer to:
acquire an image;
analyze features of said acquired image;
classify each analyzed feature of said acquired image,
select a file format for each of the analyzed features of said acquired image;
cause said image processing apparatus to create a new file in each selected file format; and include, in each generated new file of a selected file format, respective features of said acquired image.

13. The recording medium according to claim 12, wherein said selecting includes:
   extracting a graphic, a ruled line, an indent, or a character from said acquired image based on the feature of the image; and
   selecting the format of the file corresponding to the image based on a number or positional relation thereof.

14. The recording medium according to claim 12, wherein said selecting includes:
   selecting a table format as the file format, when a character or a graphic is within a ruled-line border in the image;
   selecting a document format as the file format, when a graphic, characters and a table are all present, and further when portions of the characters have starting positions aligned with each other by an indent, or when the portions of the characters have spacing of one character at their starting positions in the image;
   selecting a presentation format as the file, when there is the same graphic or the same character included in the same position of all pages in the image; and
   selecting a graphic format as the file format, when there is only a graphic included in the image.

15. The recording medium according to claim 12, wherein said selecting includes:
   selecting a presentation format as the file format, when a first condition that there is the same graphic or the same character in the same position of all pages is satisfied in the image;
   selecting a table format as the file format, when said first condition is not satisfied, and when a second condition that a character or a graphic included in the image is completely within a ruled-line border is satisfied in the image;
   selecting a document format as the file format, when said first condition and said second condition are not satisfied, and when a third condition that said image includes only a character with an indent is satisfied in the image; and
   selecting a predetermined format as the file format when none of said first condition, said second condition and said third condition is satisfied in the image.

16. The recording medium according to claim 12, wherein:
   said image processing apparatus includes a storage device;
   said program further causes said computer to perform storing contents of setting for a file format in said storage device, and causing said image processing apparatus to store the created new file in said storage device; and
   said selecting includes selecting said format corresponding to said contents of setting stored in said storage device, instead of selected said format, as the format of the file stored in said storage device.

17. The recording medium according to claim 12, wherein said creating a file includes creating a file in a format corresponding to each page, for said acquired image.

18. The recording medium according to claim 17, wherein said selecting a format includes acquiring a feature for each portion of said acquired image, and selecting a format corresponding to each portion, and said created file is a file in a format corresponding to the feature of each portion.

19. The recording medium according to claim 12, wherein:
   said selecting a format includes extracting a ruled line from said acquired image, determining whether or not a character or a graphic included in said acquired image is within an area surrounded by extracted said ruled line, and determining whether or not an image of a seal is located in the area surrounded by extracted said ruled line or in the vicinity of said ruled line; and
   said determining whether or not a character or a graphic is within an area surrounded by extracted said ruled line includes excluding the image of the seal located in the area surrounded by extracted said ruled line or in the vicinity of said ruled line from objects of this determination.

20. The recording medium according to claim 12, wherein said creating a new file includes embedding link information in the image of said created file, and said link information is information about said created file.

21. The recording medium according to claim 12, wherein said creating a new file includes generating a thumbnail image of each page of said acquired image, and generating information that associates said thumbnail image with said acquired image.

22. An image processing apparatus comprising:
   an acquisition unit configured to acquire an image; and
   a processing unit configured to select a format of a file corresponding to the image, acquired by said acquisition unit, by analyzing a feature of said image and create a file for each feature of said image in the selected format, wherein said processing unit
   (i) selects a presentation format as the format of the file corresponding to the image acquired by said acquisition unit, when a first condition that there is the same graphic or the same character in the same position of all pages is satisfied in the image,
   (ii) selects a table format as the format of the file corresponding to the image acquired by said acquisition unit, when said first condition is not satisfied, and when a second condition that a character or a graphic included in the image is completely within a ruled-line border is satisfied in the image,
   (iii) selects a document format as the format of the file corresponding to the image acquired by said acquisition unit, when said first condition and said second condition are not satisfied, and when a third condition that said image includes only a character with an indent is satisfied in the image, and
   (iv) selects a predetermined format as the format of the file corresponding to the image acquired by said acquisition unit, when none of said first condition, said second condition, and said third condition is satisfied in the image.

23. A non-transitory computer-readable recording medium recording a program executable by a computer for controlling an image processing apparatus, said program causing said computer to perform:
   acquiring an image;
   selecting a format of a file-corresponding to said acquired image, by analyzing a feature of said image; and
   causing said image processing apparatus to create a file for each feature of said image in selected said format,
   wherein said selecting includes
      selecting a presentation format as the format of the file corresponding to said acquired image, when a first condition that there is the same graphic or the same character in the same position of all pages is satisfied in the image;
      selecting a table format as the format of the file corresponding to said acquired image, when said first condition is not satisfied, and when a second condition that a character or a graphic included in the image is completely within a ruled-line border is satisfied in the image;

selecting a document format as the format of the file corresponding to said acquired image, when said first condition and said second condition are not satisfied, and when a third condition that said image includes only a character with an indent is satisfied in the image; and selecting a predetermined format as the format of the file corresponding to said acquired image, when none of said first condition, said second condition and said third condition is satisfied in the image.

* * * * *